(12) United States Patent
Awokola et al.

(10) Patent No.: US 7,361,383 B2
(45) Date of Patent: Apr. 22, 2008

(54) PROCESS FOR MULTILAYER COATING OF SUBSTRATES

(75) Inventors: Morenike Awokola, Leverkusen (DE); Carmen Flosbach, Wuppertal (DE); Helmut Loffler, Bruehl (DE)

(73) Assignee: E.I. duPont de Nemours & Company, Wilmington, DE (US)

( * ) Notice: Subject to any disclaimer, the term of this patent is extended or adjusted under 35 U.S.C. 154(b) by 402 days.

(21) Appl. No.: 09/873,714

(22) Filed: Jun. 4, 2001

(65) Prior Publication Data

US 2002/0182330 A1 Dec. 5, 2002

(51) Int. Cl.
*B05D 1/36* (2006.01)
*B05D 3/00* (2006.01)
*B05D 7/00* (2006.01)

(52) U.S. Cl. .................. 427/407.1; 427/140; 427/496; 427/500; 427/557

(58) Field of Classification Search ............. 427/407.1, 427/496, 500, 551, 140; 525/287
See application file for complete search history.

(56) References Cited

U.S. PATENT DOCUMENTS

| | | | | |
|---|---|---|---|---|
| 4,615,915 A | * | 10/1986 | Takeda et al. | 427/239 |
| 4,668,529 A | | 5/1987 | Blair | 427/54.1 |
| 5,091,211 A | * | 2/1992 | Richard | 427/44 |
| 5,596,043 A | * | 1/1997 | Harris et al. | 525/127 |
| 5,700,576 A | * | 12/1997 | Brehm et al. | 428/412 |
| 5,932,282 A | | 8/1999 | Diener et al. | 427/190 |
| 6,387,519 B1 | * | 5/2002 | Anderson et al. | 428/447 |
| 6,531,188 B1 | * | 3/2003 | Maag et al. | 427/492 |

FOREIGN PATENT DOCUMENTS

| | | | |
|---|---|---|---|
| DE | 19757082 | | 6/1999 |
| DE | 19818735 A1 | | 10/1999 |
| JP | 51030544 A | * | 3/1976 |
| JP | 61076516 A | * | 4/1986 |
| JP | 61152713 A | * | 7/1986 |
| JP | 05247155 A | * | 9/1993 |
| JP | 200154336 A | * | 6/2000 |
| WO | 99/26733 | | 6/1999 |
| WO | WO 9926733 A1 | * | 6/1999 |

* cited by examiner

*Primary Examiner*—Elena Tsoy

(57) ABSTRACT

The invention is directed to a process for multilayer coating of substrates which comprises
  a) applying a filler layer of a filler coating composition to a substrate,
  b) curing the resultant filler layer by irradiation with high energy radiation and
  c) applying a top coat layer to the cured filler layer and curing the top coat layer,
whereby the filler coating composition comprises
  A) at least one binder capable of free-radical polymerization having fewer than three olefinic double bonds per molecule,
  B) at least one ester of alpha,beta-olefinically unsaturated monocarboxylic acids capable of free-radical polymerization having one olefinic double bond per molecule and
  C) at least one compound having at least one phosphoric acid group.

7 Claims, No Drawings

PROCESS FOR MULTILAYER COATING OF SUBSTRATES

FIELD OF THE INVENTION

The invention relates to a process for multilayer coating, in particular repair coating of substrates, wherein a filler layer curable by means of high energy radiation and a top coat layer are applied. The process can be used in the field of automotive and industrial coatings.

DESCRIPTION OF RELATED ART

It is known to use coating compositions curable by means of UV (ultraviolet) radiation in vehicle coating. Coating compositions based on free-radically polymerizable binders are in particular used in such applications. These coating compositions generally contain photoinitiators. Coating compositions curable by means of UV radiation are described, for example, in DE-A-198 18 735 and U.S. Pat. No. 5,932,282.

It is likewise known in the context of vehicle coating to produce the various layers of a multilayer structure, such as, filler, base coat and/or clear coat layer, from coating compositions curable by means of UV radiation.

U.S. Pat. No. 4,668,529 accordingly describes a one-component filler coating composition for repair coating that is curable by means of UV radiation. Only reactive diluents are used as the UV curable components. These comprise tripropylene glycol triacrylate and trimethylpropane triacrylate. The composition additionally contains a physically drying epoxy resin based on a bisphenol A diglycidyl ether.

DE-A-197 57 082 describes a multilayer coating process, in which the filler coating composition used comprises either solely binders curable by free-radical and/or cationic polymerization, or binders curable by free-radical and/or cationic polymerization and further chemically crosslinking binders. Curing proceeds by means of high energy radiation.

However, known filler coating compositions curable by means of high energy radiation also exhibit, in addition to the undisputed advantageous properties of UV curable systems, several disadvantages, in particular if they are to be formulated and used as priming fillers. Priming fillers generally perform or combine the function of a primer and a filler in a single coating composition and are applied directly onto the substrate to be coated without application of a priming layer. However, UV curable priming fillers still exhibit inadequate adhesion onto metal substrates, such as, aluminium, steel and zinc. Moreover, edge marks may occur on overcoating with further coating layers and the coating compositions exhibit deficiencies with regard to stability and/or flow.

This invention provides a process for coating substrates that makes it possible to apply filler coating compositions curable by means of high energy radiation that yield coatings with excellent adhesion to the substrate, in particular, to various metal substrates. While retaining good processing characteristics, the filler coating compositions should exhibit a balanced relationship between good stability and good flow. In addition, when the filler layers are overcoated, no edge marks should occur.

SUMMARY OF THE INVENTION

This invention is directed to a process for multilayer coating of substrates comprising the steps:

a) applying a filler layer of a filler coating composition to an optionally precoated substrate, b) curing the resultant filler layer by irradiation with high energy radiation and c) applying a top coat layer of a colored and/or special effect base coat coating composition and a transparent clear coat coating composition or a pigmented one-layer top coat coating composition to the cured filler layer and curing the top coat layer;

whereby the filler coating composition comprises

A) at least one binder capable of free-radical polymerization having fewer than three olefinic double bonds per molecule, B) at least one ester of alpha,beta-olefinically unsaturated monocarboxylic acids capable of free-radical polymerization having one olefinic double bond per molecule and C) at least one compound having at least one phosphoric acid group.

DETAILED DESCRIPTION OF THE EMBODIMENTS

Preferred filler coating compositions that are used are those comprising 10-80 wt. %, particularly preferably comprising 15-60 wt. % of component A) and 20-90 wt. %, particularly preferably comprising 40-85 wt. % of component B), wherein the weight percentages of components A) and B) add up to 100 wt. %. The filler coating compositions preferably contain 1-15 wt. %, particularly preferably, 2-10 wt. % of component C), relative to the quantity of the entire coating composition.

The filler coating compositions contain binders curable by means of high energy radiation as component A). Binders curable by means of high energy radiation that may be used comprise any conventional binders radiation-curable by free-radical polymerization or mixtures thereof which meet the requirement of low functionality. The free-radically polymerizable binders must have a double bond content of fewer than 3 per molecule. A double bond content of 1.5 to 2.5 per molecule is preferred.

The person skilled in the art is aware of such binders and is able to produce them in accordance with conventional methods to achieve the desired functionality.

The free-radically polymerizable binders may, for example, comprise prepolymers, such as, polymers or oligomers, which comprise free-radically polymerizable olefinic double bonds in the molecule. The polymerizable double bonds may, for example, be present in the form of (meth)acryloyl, vinyl, allyl, maleate and/or fumarate groups. The free-radically polymerizable double bonds are particularly preferably present in the form of (meth)acryloyl groups.

Examples of prepolymers or oligomers are (meth)acrylic-functional (meth)acrylic copolymers, epoxy resin (meth)acrylates, polyester (meth)acrylates, polyether (meth)acrylates, polyurethane (meth)acrylates, amino (meth)acrylates, silicone (meth)acrylates, melamine (meth)acrylates, unsaturated polyurethanes or unsaturated polyesters. The number average molecular mass (Mn) of these compounds is preferably from 200 to 8000. (Cyclo)aliphatic polyurethane (meth)acrylates, polyester (meth)acrylates, (meth)acrylic-functional poly(meth)acrylates and epoxy (meth)acrylates are preferred. The binders may be used individually or as a mixture.

Both here and below, (meth)acrylate, (meth)acrylic and (meth)acryloyl are intended to mean methacrylate and/or acrylate, methacrylic and/or acrylic, and acryloyl and/or methacryloyl.

The filler coating compositions contain component B). Component B) are esters of olefinically unsaturated monocarboxylic acids capable of free-radical polymerization having one olefinic double bond per molecule. Component B) acts as reactive diluent. Reactive diluents are reactive, polymerizable liquid monomers that act as solvents for the system and participate in the crosslinking reaction. Components B) are esters of olefinically unsaturated monocarboxylic acids with aliphatic, cycloaliphatic or aromatic alcohols. Olefinically unsaturated monocarboxylic acids that may be considered are, for example, methacrylic acid, crotonic acid and isocrotonic acid. The alcohols in particular comprise aliphatic, cycloaliphatic or aromatic, monohydric branched or unbranched alcohols having 1-20 carbon atoms per molecule. Component B) preferably comprises esters of (meth) acrylic acid. Examples of (meth)acrylic acid esters with aliphatic alcohols are methyl acrylate, ethyl acrylate, isopropyl acrylate, tert.-butyl acrylate, n-butyl acrylate, isobutyl acrylate, 2-ethylhexyl acrylate, lauryl acrylate, stearyl acrylate and the corresponding methacrylates. Cycloaliphatic (meth)acrylates may also optionally be substituted. The substituents comprise, for example, one or more, for example up to three alkyl groups, in particular those having 1-4 carbon atoms. Examples of (meth)acrylic acid esters with cycloaliphatic alcohols are cyclohexyl acrylate, trimethylcyclohexyl acrylate, 4-tert.-butylcyclohexyl acrylate, isobornyl acrylate and the corresponding methacrylates. Examples of (meth)acrylates with aromatic alcohols are benzyl (meth)acrylates. (Meth)acrylic acid esters with cycloaliphatic alcohols, such as, isobornyl (meth)acrylate, cyclohexyl (meth)acrylate and derivatives thereof are particularly preferred as component B).

The filler coating compositions contain compounds having at least one phosphoric acid group as component C). The compounds may comprise low molecular weight and/or relatively high molecular weight compounds, such as, monomers, oligomers and/or polymers. The compounds may, for example, have acid values of 200-400 mg of KOH/g, preferably of 250-350 mg of KOH/g. Component C) compounds preferably contain at least one free-radically polymerizable double bond. Examples of usable low molecular weight compounds are phosphoric acid partial esters or phosphoric acid ester derivatives. Examples of usable low molecular weight compounds comprising olefinic double bonds are modified phosphoric acid partial esters or phosphoric acid ester derivatives with a molecular mass of, for example, 180 to 500 g/mol. Modification may preferably proceed with (meth)acryloyl groups, for example, by reaction of phosphoric acid or phosphoric acid derivatives with (meth)acryloyl-functional monomers, such as, hydroxyalkyl (meth)acrylates having, for example, 1-10, preferably 1-4 C atoms in the alkyl residue. The low molecular weight compounds may be present as monomers and/or oligomers, for example dimers. Such compounds are also commercially available, for example under the names "Additol" VXL 6219 (Solutia), ITC 835 (Albright and Wilson) and Additive 97-070 (Rahn).

Examples of relatively high molecular weight compounds usable as component C) are resins modified with phosphoric acid groups and having a number average molecular mass (Mn) of, for example, 500 to 8000 g/mol. In the preferred case of modification of component C) with free-radically polymerizable double bonds, the stated resins may additionally be (meth)acryloyl-functional. The (meth)acryloyl-functional resins with phosphoric acid groups comprise conventional polyester, polyurethane, polyether, epoxy and acrylic (meth)acrylates known to the person skilled in the art, which are appropriately modified, for example by reaction of appropriate epoxy-functional resins with phosphoric acid or phosphoric acid partial esters.

In addition to component C), further reactive diluents other than component C) may also be present. The additional reactive diluents may be used in quantities of, for example, 1-20 wt. %, relative to the total weight of prepolymers, oligomers and reactive diluents. The additional reactive diluents may be di- or polyunsaturated, but they may also comprise monofunctional reactive diluents other than component C). Examples of monounsaturated reactive diluents are: maleic acid, fumaric acid and the semi-esters thereof, vinyl acetate, vinyl ethers, substituted vinylureas, styrene, vinyltoluene. Examples of diunsaturated reactive diluents are: di(meth)acrylates, such as, alkylene glycol di(meth) acrylate, polyethylene glycol di(meth)acrylate, 1,3-butanediol di(meth)acrylate, vinyl (meth)acrylate, allyl (meth) acrylate, divinylbenzene, dipropylene glycol di(meth) acrylate, hexanediol di(meth)acrylate. Examples of polyunsaturated reactive diluents are: glycerol tri(meth) acrylate, trimethylolpropane tri(meth)acrylate, pentaerythritol tri(meth)acrylate, pentaerythritol tetra(meth)acrylate. The additional reactive diluents may be used individually or as a mixture.

The filler coating compositions that cure under the action of radiation contain photoinitiators. Suitable photoinitiators include, for example, those which absorb in the wavelength range from 190 to 600 nm.

Examples of usable photoinitiators are benzoin and derivatives, acetophenone and derivatives, such as, 2,2-diacetoxyacetophenone, benzophenone and derivatives, thioxanthone and derivatives, anthraquinone, 1 benzoylcyclohexanol, organophosphorus compounds, such as, acyl phosphine oxides. The photoinitiators are used, for example, in quantities of 0.1-7 wt. %, preferably of 0.5-5 wt. %, relative to the total of free-radically polymerizable prepolymers, reactive diluents and photoinitiators. The photoinitiators may be used individually or in combination.

The filler coating compositions curable by means of high energy radiation may also contain, in addition to the free-radically polymerizable components free-radically polymerizable by means of high energy radiation, further components, for example binders and/or reactive diluents that are chemically crosslinkable by an additional curing mechanism. Chemically crosslinking binders that may be used are, for example, any desired two-component binder systems based on a hydroxy-functional component and an isocyanate-functional component, a hydroxy-functional component and an anhydride component, a polyamine component and an epoxide component. The additional functional groups and the double bonds may here be present in the same binder and/or in separate binders.

The filler coating compositions usable in the process according to the invention may contain fillers and pigments. These comprise the conventional fillers and organic or inorganic colored and/or corrosion protection pigments usable in the coatings industry. Examples of pigments are titanium dioxide, micronized titanium dioxide, iron oxide pigments, carbon black, azo pigments, zinc phosphate. Examples of fillers are silicon dioxide, aluminium silicate, barium sulfate and talcum.

The filler coating compositions usable in the process according to the invention may comprise water-based or solvent-based coating compositions. They may contain water and/or organic solvents. In the case of water-based coating compositions, the binders present may be ionically or nonionically stabilized in order to achieve sufficient water dilutability. Alternatively or in addition, it is possible to achieve water dilutability by means of external emulsifiers. The coating compositions may, however, also take the form of 100% systems without organic solvents and water.

The solvents comprise conventional coating solvents. These may originate from the preparation of the binders or may be added separately. Examples of such solvents are mono- or polyhydric alcohols, for example, propanol, butanol, hexanol; glycol ethers or esters, for example, ethylene glycol monobutyl ether, diethylene glycol monobutyl ether, diethylene glycol dialkyl ethers, dipropylene glycol dialkyl ethers, ethylene glycol monoethyl ether acetate, ethylene glycol monobutyl ether acetate, diethylene glycol monobutyl ether acetate, esters, such as, butyl acetate, isobutyl acetate, butyl acetate, glycols, for example, ethylene glycol, propylene glycol and the oligomers thereof, N-methylpyrrolidone and ketones, for example, methyl ethyl ketone, acetone, cyclohexanone; aromatic or linear or branched aliphatic hydrocarbons, for example, toluene or xylene.

The filler coating compositions may furthermore contain additives conventionally used in connection with coatings. Examples of additives conventionally used in connection with coatings are levelling agents, rheological agents, such as, highly disperse silica or polymeric urea compounds, thickeners, for example, based on crosslinked carboxy-functional polymers or on polyurethanes, defoamers, wetting agents, dispersants, anticratering agents, catalysts. The additives are used in conventional quantities known to the person skilled in the art.

The filler coating compositions are produced in the conventional manner known to the person skilled in the art.

According to the process according to the invention, the filler layer is first applied onto an optionally precoated substrate. Substrates may be, for example, metal or plastic substrates. The filler layers may be applied onto conventional priming or other intermediate layers, as are used in multilayer coating in the automotive sector. They may be applied onto an automotive body or parts thereof precoated or pretreated as part of a multilayer coating process, but they may also be applied onto existing coatings. The filler layers may particularly advantageously be applied directly onto bright metal substrates, such as, iron, steel, galvanized steel, aluminium and zinc. Application may be performed using known methods, preferably by means of spraying.

Once the filler coating composition has been applied onto one of the above-stated substrates, the filler layer is exposed, optionally after a flash-off phase to high energy radiation, preferably UV radiation. Usable UV radiation sources are those emitting in the wavelength range from 180 to 420 nm, in particular, from 200 to 400 nm. Examples of such UV radiation sources are optionally doped high, medium and low pressure mercury vapour emitters, gas discharge tubes, such as, low pressure xenon lamps, unpulsed UV lasers, UV point source emitters, such as, UV emitting diodes and black light tubes.

In addition to these continuously operating UV radiation sources, it is, however, also possible to use discontinuous UV radiation sources, for example pulsed UV lasers or "high energy flash installations" (known in short as UV flash lamps). The UV flash lamps may contain a plurality of flash tubes, for example, quartz tubes filled with inert gas such as, xenon. The UV flash lamps have an illuminance of, for example, at least 10 megalux and preferably from 10 to 80 megalux per flash discharge. The energy per flash discharge may be, for example, 1 to 10 kJoule.

The irradiation time with UV radiation when UV flash lamps are used as the UV radiation source may be, for example, in the range from 1 millisecond to 400 seconds, preferably, from 4 to 160 seconds, depending on the number of flash discharges selected. The flashes may be triggered, for example, about every 4 seconds. Curing may take place, for example, by means of 1 to 40 successive flash discharges. If continuous UV radiation sources are used, the irradiation time may be, for example, in the range from a few seconds to about 5 minutes, preferably, less than 5 minutes.

The distance between the UV radiation sources and the substrate surface to be irradiated may be, for example, 5 to 60 cm.

If required, once the filler layer has been applied and irradiated, one or more further similar filler layers may be applied in further operations and exposed to UV irradiation.

If the filler coating compositions contain binders which cure by an additional crosslinking mechanism, the coatings may be left after the irradiation operation to cure completely at room temperature, for example, for 16 to 24 hours. It is also possible to perform complete curing at higher temperatures of, for example, 30 to 130° C., preferably of 40 to 80° C. Complete curing may take place by conventional methods, for example, in a heated booth or by means of IR radiation. Depending upon the curing temperature, curing times of for example 1 to 60 minutes are possible. Thermal curing may, of course, also be performed before the irradiation phase or before and after the irradiation phase.

The filler coating compositions usable in the process according to the invention may be used as a sandable filler and particularly advantageously, as a priming filler.

Once the filler layer has been cured by means of high energy radiation, in accordance with the process according to the invention the filler layer is overcoated with a top coat of a colored and/or special effect base coat layer and a transparent clear coat layer or a top coat of a pigmented one-layer top coat. No particular restrictions apply with regard to the base, clear and one-layer top coat coatings that are to be used at this point.

Any solvent- or water-based base coatings known to the person skilled in the art and conventional in automotive coating, in particular in repair coating, are suitable as the colored and/or special effect coatings for the base coat/clear coat top coat. Examples of solvent-based base coatings are those based on polyacrylate and/or polyester resins, optionally, in combination with melamine resins and cellulose esters. Examples of water-based coatings are those based on physically drying polyurethane, polyurethane/urea, polyester, polyesterurethane and/or polyacrylate resins and the modifications thereof, such as, acrylated or silicon-modified polyurethane and/or polyester resins. Further, water-based coatings that may be considered are those prepared from chemically crosslinking binder components, for example, from binders containing hydroxyl groups and polyisocyanate crosslinking agents. Curing of the base coat may proceed at room temperature or be forced at, for example, 40-80° C. or at higher temperatures up to, for example, 130° C. The base coat layer, however, optionally after a flash-off phase, also may be overcoated wet-on-wet with a clear coat and then be cured together with the clear coat at the above-stated temperatures.

Any solvent- or water-based clear coatings known to the person skilled in the art and conventional in automotive coating, in particular in repair coating, are suitable as the clear coatings for the base coat/clear coat top coat. Examples of such coatings are solvent-based or aqueous clear coatings based on binders containing hydroxyl groups and/or amino groups and polyisocyanate crosslinking agents and those based on binders containing amino groups and acryloyl groups. Curing of the clear coat layer may proceed at room temperature or be forced at, for example, 40-80° C. or at higher temperatures up to, for example, 130° C.

Alternatively, the top coat applied onto the filler layer may also comprise a pigmented one-layer top coat of a conventional solvent- or water-based pigmented one-layer top coat coating composition, which is cured at the above-stated temperatures.

As base coat, clear coat and/or one-layer top coat for preparing the top coat layer are also suitable coating compositions curable by means of UV radiation.

The process according to the invention may be used in automotive and industrial coatings, particularly advantageously in repair coatings, in particular in repair coatings of vehicles and vehicle parts.

By means of the process according to the invention, filler layers are obtained that have excellent adhesion, in particular onto various metal substrates, such as, iron, steel, galvanized steel, aluminium and zinc. The filler coating compositions applied in the process according to the invention have good processing properties and exhibit a good balance between good stability and satisfactory flow. When repair coating areas that have been sanded back to the substrate, no edge marks occur when the filler layers are overcoated with a top coat.

The following Examples are intended to illustrate the invention in greater detail.

All values are stated by weight.
pbw=parts by weight.

EXAMPLES

Example 1

Production of a Urethane Acrylate (Component A)

A mixture of 521 pbw of hexamethylene diisocyanate isocyanurate and 0.9 pbw of methylhydroquinone was initially introduced in a 2 liter glass reactor equipped with a temperature sensor, stirrer and dropping funnel and heated to 60° C. A mixture of 211 pbw of hydroxyethyl acrylate, 67 pbw of n-butanol and 0.1 pbw of dibutyltin dilaurate was added dropwise to said first mixture in such a manner that the temperature did not rise above 80° C. The reaction mixture was then kept at 80° C. until the NCO value was below 0.1%. The mixture was then diluted with 200 pbw of isobornyl acrylate. A colorless, viscous resin with an acryloyl functionality of 2, a solids content (1 h/150° C.) of 79.7% and a viscosity (25° C.) of 22700 mPas was obtained.

Example 2

Production of a Filler Coating Composition

A filler coating composition was produced from the following components:
23 pbw of urethane acrylate according to Example 1
50 pbw of isobornyl acrylate
1 pbw of "Disperbyk" 110 (dispersion additive; 53% solution of a copolymer with acidic groups; Byk)
0.01 pbw of carbon black
1.0 pbw of titanium dioxide
0.5 pbw of Aerosil® (silica)
8.0 pbw of kaolin
4.0 pbw of talcum
13.0 pbw of barytes
2 pbw of "Irgacure" 819 (phosphine oxide based photoinitiator; CIBA)
4 pbw of "Additol" VXL 6219 (acrylic-modified phosphoric acid ester, acid value 320 mg KOH/g; Solutia)

Example 3

Production of a Multilayer Structure

A filler layer of the filler coating composition produced in Example 2 was applied by spraying onto bright sheet steel to yield a dry layer thickness of 150 µm. Immediately after application, the filler layer was exposed to irradiation by the UV flash lamp (3500 Ws). Irradiation was performed by 30 flashes; a flash being triggered every 4 seconds.

A damaged OEM coating on sheet steel was also repaired, the damaged area being sanded and cleaned for this purpose. The coating was sanded right back to the sheet steel. A filler layer was sprayed onto the sanded damaged area to yield a dry layer thickness of approx. 150 µm. Immediately after application, irradiation was performed with a UV flash lamp as described above.

The filler layers were then each overcoated with a conventional commercial solvent-based, yellow-pigmented two-component top coat based on hydroxyacrylate/polyisocyanate ("Standocryl 2K-Autolack"; Standox GmbH). Curing was performed for 30 minutes at 60° C.

Presentation of Coating Results

Adhesion to Substrate

The steel sheet previously coated with filler and top coat was subjected, after 3 days' storage at room temperature, to a condensing water constant climate test (to DIN 50017) for 72 hours. After 24 hours regeneration at room temperature, crosshatching (to DIN 53151), degree of blistering (to DIN 53209) and gloss (to DIN 67530) were evaluated.
Crosshatching result: 0-1
Blistering result: m0/g0
Gloss measurement result: 20°=85 units/60°=93 units The crosshatching and degree of blistering evaluations revealed very good adhesion results.

The filler layer exhibited elevated solvent resistance, as a result of which the gloss values of the subsequently applied top coat are excellent.

The repaired OEM coating that had been sanded back to the substrate exhibited no internal or external edge marks.

The filler coating compositions were straightforward to process and could be applied using conventional filler spray guns.

Flow of the filler coating composition was very good, as was stability. Layer thicknesses of 150 µm could be applied in a single spray pass without an intermediate flash-off time.

What is claimed is:

1. A process for repair coating of vehicle substrates which comprises:
   a) applying a filler layer of a filler coating composition to a metal substrate,
   b) curing the resultant filler layer by irradiation with high energy radiation and
   c) applying a top coat layer to the cured filler layer and curing the top coat layer,
   wherein the liquid filler coating composition comprises
   A) 15-60 weight-% of at least one free-radically polymerizable binder comprising at least one free-radically polymerizable olefinic double bond, said binder having fewer than three of said olefinic double bonds per molecule, B) 40-85 weight-% of a free-radically polymerizable reactive diluent comprising at least one (meth)acrylic acid ester having an olefinic double bond, said at least one (meth)acrylic acid ester being formed by reacting (meth)acrylic acid with at least one cycloaliphatic alcohol, wherein the weight-% of components A) and B) adds up to 100 weight-%, and C) 2-10 weight-% of at least one compound having at least one phosphoric acid group and containing at least one free-radically polymerizable double bond, wherein the weight-% of component C) is relative to quantity of the entire coating composition;

wherein said cured filler layer produces no edge marks when said topcoat layer is applied.

2. The process according to claim 1, wherein the top coat layer comprises a colored and/or special effect base coat coating composition and a transparent clear coat coating composition applied over the base coat coating composition.

3. The process according to claim 1, wherein the top coat layer comprises a pigmented one-layer top coat coating composition.

4. The process according to claim 1, wherein the filler coating composition comprises as component A) at least one binder capable of free-radical polymerization having 1.5 to 2.5 olefinic double bonds per molecule.

5. The process according to claim 1, wherein the filler coating composition comprises as component B) isobornyl (meth)acrylate.

6. The process according to claim 1, wherein the filler coating composition comprises as component C) at least one (meth)acryloyl-modified phosphoric acid derivative.

7. The process according to claim 1, wherein the metal substrate comprises at least one of an automotive body and an automotive part.

\* \* \* \* \*